US011802539B2

(12) United States Patent
Achten (10) Patent No.: US 11,802,539 B2
(45) Date of Patent: Oct. 31, 2023

(54) HYDRAULIC DEVICE AND A PIVOT JOINT

(71) Applicant: INNAS, BV, Breda (NL)

(72) Inventor: Peter Augustinus Johannes Achten, Eindhoven (NL)

(73) Assignee: INNAS, BV

( * ) Notice: Subject to any disclaimer, the term of this patent is extended or adjusted under 35 U.S.C. 154(b) by 386 days.

(21) Appl. No.: 16/646,058

(22) PCT Filed: Oct. 24, 2018

(86) PCT No.: PCT/EP2018/079110
§ 371 (c)(1),
(2) Date: Mar. 10, 2020

(87) PCT Pub. No.: WO2019/081558
PCT Pub. Date: May 2, 2019

(65) Prior Publication Data
US 2020/0277930 A1    Sep. 3, 2020

(30) Foreign Application Priority Data
Oct. 25, 2017    (EP) ..................... 17198292

(51) Int. Cl.
*F03C 1/06*    (2006.01)
*F04B 1/2092*    (2020.01)
(Continued)

(52) U.S. Cl.
CPC .......... *F03C 1/0642* (2013.01); *F03C 1/0673* (2013.01); *F04B 1/2014* (2013.01);
(Continued)

(58) Field of Classification Search
CPC .... F03C 1/0642; F03C 1/0673; F04B 1/2014; F04B 1/2092; F16D 3/205; F16D 3/2055
See application file for complete search history.

(56) References Cited

U.S. PATENT DOCUMENTS 5,488,894 A    2/1996    Schröder et al.
7,967,574 B2 *    6/2011    Achten ............... F04B 1/2071
91/506
(Continued)

FOREIGN PATENT DOCUMENTS

DE    102015100620 A1    7/2016
EP    1944510 A1    7/2008
(Continued)

OTHER PUBLICATIONS

Extended European Search Report for corresponding European application No. 17198292.9; dated Apr. 3, 2018 (9 pages).
(Continued)

*Primary Examiner* — Kenneth J Hansen
*Assistant Examiner* — Benjamin Doyle
(74) *Attorney, Agent, or Firm* — Mendelsohn Dunleavy, P.C.

(57) ABSTRACT

A hydraulic device (1) comprises a housing (2) and a shaft (3) which is rotatable about a first axis of rotation (4). The shaft (3) has a flange (8), a partly spherical portion (16) and a plurality of pistons (9), which are fixed to the flange (8). The device (1) also has a plurality of cylindrical sleeves (11), wherein each sleeve (11) has a sleeve bottom (13) comprising a sleeve opening (14) including a centreline (23). The sleeves (11) cooperate with the pistons (9) to form respective compression chambers (12) of variable volume. A barrel plate (15) is mounted on the partly spherical portion (16) and has barrel plate ports (21) including respective centrelines (22). The sleeves (11) are rotatable about a second axis of rotation (19) which intersects the first axis of rotation (4) by an acute swash angle. The barrel plate (15) is coupled to the shaft (3) in rotational direction thereof by means of a plurality of pin-groove couplings creating a plurality of pivot axes (24) about the second axis of rotation (19). The
(Continued)

widths of the grooves (18) allow the pins (17) to move within the respective corresponding grooves (18) in rotational direction about the second axis of rotation (19) under operating conditions. The relative position of the shaft (3) and the barrel plate (15) in rotational direction about the second axis of rotation (19) is adapted such that under operating conditions each centreline (22) of the respective barrel plate ports (21) fluctuates in rotational direction about the second axis of rotation (19) with respect to the centreline (23) of the corresponding sleeve opening (14) within a range in which the centreline (23) of the sleeve opening (14) lies.

11 Claims, 7 Drawing Sheets

(51) Int. Cl.
  *F04B 1/24* (2006.01)
  *F04B 1/2014* (2020.01)
  *F16D 3/205* (2006.01)
(52) U.S. Cl.
  CPC .............. *F04B 1/2092* (2013.01); *F04B 1/24* (2013.01); *F16D 3/205* (2013.01); *F16D 3/2055* (2013.01)

(56) References Cited

U.S. PATENT DOCUMENTS

| 9,963,967 B2* | 5/2018 | Bergmann ............... F04B 53/18 |
| 10,830,221 B2* | 11/2020 | Achten ..................... F04B 1/22 |
| 10,914,172 B2* | 2/2021 | Achten ................. F01B 3/0052 |
| 10,961,990 B2* | 3/2021 | Achten ..................... F04B 1/22 |
| 11,067,067 B2* | 7/2021 | Achten ..................... F04B 1/24 |
| 2005/0019171 A1* | 1/2005 | Achten ................. F04B 1/2035 417/269 |
| 2006/0120881 A1* | 6/2006 | Dantlgraber .............. F04B 1/24 91/472 |
| 2008/0250920 A1* | 10/2008 | Herrmann ............. F04B 1/2035 91/498 |
| 2009/0196768 A1* | 8/2009 | Nelson .................. F04B 1/2007 417/269 |
| 2013/0195687 A1* | 8/2013 | Achten ................... F04B 1/328 417/222.1 |
| 2017/0335820 A1* | 11/2017 | Pecorari ................ F04B 1/2092 |

FOREIGN PATENT DOCUMENTS

| JP | 2005-538283 A | 12/2005 |
| WO | 03058035 A1 | 7/2003 |
| WO | 2006083163 A1 | 8/2006 |

OTHER PUBLICATIONS

International Search Report and Written Opinion for corresponding International application No. PCT/EP2018/079110; dated Jan. 25, 2019 (14 pages).
International Preliminary Report and Patentability for corresponding International application No. PCT/EP2018/079110; dated Apr. 28, 2020 (10 pages).
First Office Action for corresponding Chinese application No. 201880068176.7; dated Sep. 7, 2021 (9 pages) Machine Translation.
Notification of Reasons for Refusal for corresponding Japanese application No. 2020-516631; dated Oct. 4, 2022 (18 pages).

* cited by examiner

HYDRAULIC DEVICE AND A PIVOT JOINT

The present invention relates to a hydraulic device comprising a housing, a shaft which is mounted in the housing and rotatable with respect to the housing about a first axis of rotation, wherein the shaft has a flange extending transversely to the first axis of rotation, and a partly spherical portion including a centre point remote from the flange, a plurality of pistons including respective piston centrelines which have components extending parallel to the first axis of rotation, which pistons are fixed to the flange at equiangular distance about the first axis of rotation, a plurality of cylindrical sleeves, wherein each sleeve has a sleeve bottom comprising a sleeve opening including a centreline, which sleeves cooperate with the pistons to form respective compression chambers of variable volume, a barrel plate which is mounted on the partly spherical portion of the shaft and which has barrel plate ports including respective centrelines, wherein the barrel plate has a first side which supports the sleeve bottoms and an opposite second side which is supported by a face plate that is mounted in the housing and angled with respect to the first axis such that the sleeves are rotatable about a second axis of rotation which intersects the first axis of rotation at the centre point by an acute swash angle such that during rotating the shaft the volumes of the compression chambers change, wherein the barrel plate is coupled to the shaft in rotational direction thereof by means of a pin-groove coupling where a groove is located in one of said partly spherical portion and the barrel plate and a pin is located in the other one of the partly spherical portion and the barrel plate, wherein the groove has a longitudinal direction extending in the same direction as one of the first and second axis of rotation and the pin is received by said groove, hence creating a pivot axis of the barrel plate which extends perpendicular to the second axis and runs through the centre point, wherein under operating conditions each compression chamber alternatingly communicates via the corresponding sleeve opening and barrel plate port with ports in the face plate.

A hydraulic device as described above is known from WO 2006/083163. The known device has a shaft including a partly spherical portion on which a drum plate can swivel. The drum plate has a keyway which interacts with a key in the shaft at the partly spherical portion thereof. Consequently the drum plate rotates together with the shaft about the second axis of rotation. The resulting pivot axis of the drum plate rotates together with the shaft about the second axis of rotation. The key reciprocatingly travels in longitudinal direction of the keyway. The shaft drives the sleeves in rotational direction about the first axis of rotation via the pistons. Because of the key and keyway coupling the rotational speed of the drum plate varies when the shaft rotates at a constant speed or the rotational speed of the shaft varies when the drum plate rotates at a constant speed. Consequently, the relative positions of the sleeves and the drum plate vary in rotational direction about the second axis of rotation under operating conditions. This also means that the positions of the centrelines of the respective sleeve openings and the corresponding centrelines of the respective drum plate ports vary, resulting in varying pressure fields between the drum plate and the sleeves causing a tipping torque on the drum plate.

It is desired to minimize tipping torque since it might lead to increased friction between the drum plate and the face plate and under severe conditions this may even cause accelerated wear of the drum plate and the face plate. Besides, minimizing tipping torque means that the maximum allowable speed of the hydraulic device can be higher than in conventional hydraulic devices.

An object of the invention is to provide a hydraulic device which minimizes tipping torque.

This object is accomplished with the device according to the invention, which is characterized in that it comprises a plurality of said pin-groove couplings creating a plurality of pivot axes at equiangular distance about the second axis of rotation, wherein the widths of the grooves allow the pins to move within the respective corresponding grooves in rotational direction about the second axis of rotation under operating conditions, wherein the relative position of the shaft and the barrel plate in rotational direction about the second axis of rotation is adapted such that under operating conditions each centreline of the respective barrel plate ports fluctuates in rotational direction about the second axis of rotation with respect to the centreline of the corresponding sleeve opening within a range in which the centreline of the sleeve opening lies.

An increasing number of pivot axes approaches a homokinetic joint and leads to a reduction of the amplitude of the fluctuation of the barrel plate and the sleeves with respect to each other. Since the relative position of the shaft and the barrel plate is adapted, as well, the hydraulic device according to the invention minimizes tipping torque of the barrel plate, which allows a relatively high maximum speed of the hydraulic device.

The combination of an increasing number of pivot axes and adapting the relative position of the shaft and the barrel plate as described above is not obvious when considering the modifications of an existing hydraulic device including a single pin-groove coupling by applying additional pin-groove couplings, which will be explained below.

In case of a single pin-groove coupling the pin and a groove edge contact each other at a contact location. When the shaft is driven at a constant speed the contact location travels reciprocatingly with respect to the shaft about the centre point of the partly spherical portion in longitudinal and lateral direction of the groove and in radial direction of the second axis of rotation. Consequently, the barrel plate position fluctuates with respect to the shaft in rotational direction about the second axis of rotation, whereas the constant rotational speed of the shaft causes a constant speed of the sleeves about the second axis of rotation. This results in varying relative rotational positions of the barrel plate ports and the sleeve openings. In this case the single pin-groove coupling has a single contact location which is maintained during an entire revolution of the shaft.

In case of a plurality of pin-groove couplings that create a plurality of pivot axes the respective pin-groove couplings alternatingly form contact locations during an entire revolution of the shaft. Since the pivot axes are located at angular distance about the second axis of rotation the relative positions of the pin and groove of the respective pin-groove couplings are different. If each of the pin-groove couplings maintained a contact location during an entire revolution there would be a kinematic conflict because of the fluctuations of each contact location with respect to the shaft in rotational direction about the second axis of rotation as described above. The kinematic conflict is avoided in the device according to the invention, since the widths of the grooves allow the pins to move within the respective corresponding grooves in rotational direction about the second axis of rotation under operating conditions. Because of the freedom of movement of each pin in the corresponding groove, each groove must be wider than the diameter of the cooperating pin.

During rotation of the shaft at a constant speed there is still a fluctuation of the actual contact location with respect to the shaft at one of the pin-groove couplings, but after a certain angle of rotation a next pin-groove coupling corresponding to a different pivot axis will form a new contact location whereas the contact at the former pin-groove coupling will be lost. Although there are still fluctuations within each contact period of the successive contact locations, each of the fluctuations has a smaller amplitude in rotational direction about the second axis of rotation than in case of a single pivot axis. In other words, the positions of one of the pin and groove of each pin-groove coupling that corresponds to a pivot axis will fluctuate in rotational direction about the second axis of rotation by a certain amplitude with respect to the shaft, but the amplitude of each of the fluctuating contact locations is smaller. Similarly, the amplitude of fluctuation of the barrel plate with respect to the shaft about the second axis of rotation is smaller than the amplitude of the relative movement of the individual pins and cooperating grooves.

The alternating contact locations introduce a phase shift with respect to a device including a single pivot axis, since each time when one of the pin and groove of a pin-groove coupling tends to delay the barrel plate with respect to the shaft, a next pin-groove coupling takes over the driving action of the shaft. As a consequence, each of the contact locations will fluctuate with respect to the shaft in rotational direction about the second axis of rotation about a centre which is remote from the centre of fluctuation in case of a single pivot axis.

The mentioned phase shift is solved in the device according to the invention by introducing an offset with respect to a device including a single pivot axis, which offset is between the barrel plate and the shaft in rotational direction about the second axis of rotation. Therefore, the relative position of the shaft and the barrel plate in rotational direction about the second axis of rotation is adapted such that under operating conditions the centrelines of the barrel plate ports fluctuate in rotational direction about the second axis of rotation with respect to the centrelines of the corresponding sleeve openings within a range in which the centrelines of the sleeve openings lie.

It is noted that a device which is provided with only two pin-groove couplings that are located with respect to each other at an angular distance of 180° about the second axis of rotation is not covered by the claims since the two pin-groove couplings form a single pivot axis similar to a device including only a single pin-groove coupling.

In a preferred embodiment the centreline of each of the barrel plate ports fluctuates about a centreline which substantially coincides with the centreline of the corresponding sleeve opening, since this provides a symmetrical fluctuation and minimizes tipping torque.

In a specific embodiment each of the grooves has parallel groove edges. In this case the distance between the groove edges must be wider than the diameter of the cooperating pin in order to allow the pin and groove to move with respect to each other under operating conditions as described above. This embodiment is preferably used for applications in which a hydraulic device is operated in one rotational direction, since rotating the shaft in opposite direction would introduce a phase shift as described above.

In an alternative embodiment each of the grooves has a midpoint from which the groove width increases in opposite directions in longitudinal direction of the groove. This embodiment provides the opportunity to allow the respective contact locations between the pins and the cooperating grooves of the respective pin-groove couplings to follow a path along the respective groove edges which is substantially the same or close to the path which is followed by one of the pin and groove during the corresponding contact period. This provides the opportunity to adapt the groove edge profile such that the above-mentioned phase shift in case of a plurality of pivot axes is compensated. Besides, this embodiment provides the opportunity to create mirrored profiles of the groove edges such that the same effect is achieved in opposite rotational directions of the shaft, hence minimizing any phase shift when switching the rotational direction. The relative positions of the shaft and the barrel plate in rotational direction about the second axis of rotation may be adapted such that when one of the pins is located in the midpoint of the cooperating groove the centreline of each barrel plate port substantially coincides with the centreline of the corresponding sleeve opening.

At least at the midpoint each of the groove edges may be angled with respect to the longitudinal centreline of the groove by a half of the swash angle. If the swash angle is variable each of the groove edges may be angled by a half of the maximum swash angle. Increasing the swash angle above this maximum would lead to a kinematic conflict as described above. Decreasing the swash angle introduces a slight phase shift between the shaft and the barrel plate.

Preferably, the pins accurately fit in the respective grooves at their midpoints so as to minimize any play in rotational direction of the shaft. This minimizes any phase shift upon reversing the rotational direction of the shaft. The widths of the grooves at their midpoints and the dimensions of the respective pins can be matched to each other within allowable tolerance requirements.

The groove edges of each groove may be substantially straight from the midpoint to at least a location where the pins and groove edges loose contact under operating conditions. A straight groove edge is advantageous in terms of manufacturing effort.

In a preferred embodiment the width of the groove outside a repetitive contact area between the pin and the groove edge is increased, at least by a slope which is larger than any slope within the contact area, since this allows the pins which are temporarily out of contact with the groove edge to move into the widened portion of the groove. This means that the width of a central portion of each groove where the cooperating pin temporarily contacts the groove edge may be relatively narrow which minimizes any phase shift if the shaft is rotated in opposite directions, even in case of parallel groove edges.

In a practical embodiment the pins of the respective pin-groove couplings are fixed in the shaft and the grooves are located in the barrel plate. The pins may be cylindrical including a circular cross-section.

The invention is also related to a pivot joint comprising a support, a first shaft which is mounted to the support and rotatable with respect to the support about a first axis of rotation, wherein the first shaft has a partly spherical portion including a centre point, a second shaft which is mounted to the support, on the one hand, and to the partly spherical portion of the first shaft, on the other hand, such that the second shaft is rotatable with respect to the support about a second axis of rotation which intersects the first axis of rotation at the centre point by an acute angle, wherein the second shaft is coupled to the first shaft in rotational direction thereof by means of a plurality of pin-groove couplings, wherein each pin-groove coupling comprises a groove which is located in one of the partly spherical portion and the second shaft and a pin which is located in the other one of the partly spherical portion and the second shaft, wherein the groove has a longitudinal direction extending in the same direction as one of the first and second axis of rotation and the pin is received by the groove, wherein the pin-groove couplings are arranged such that a plurality of pivot axes about which the first and second shafts pivot with respect to each other are created at equiangular distance about one of the first and second axes of rotation, wherein each pivot axis extends perpendicular to the one of the first and second axes of rotation and runs through the centre point, wherein each of the grooves has a midpoint from which the groove width increases in opposite directions in longitudinal direction of the groove, wherein preferably the pins are cylindrical and have a circular cross-section.

In a particular embodiment at least at the midpoint opposite groove edges are mirrored with respect to a longitudinal centreline of the groove and angled with respect to each other, preferably by the acute angle, and preferably by a predefined maximum acute angle if the acute angle is variable. In this embodiment the groove has a waisted shape as seen in plan view, wherein the narrowest width is located at the midpoint. The opposite groove edges extending from the narrowest width of the groove may be straight.

The pins preferably fit accurately in the respective grooves at their midpoints.

The width of the groove outside a repetitive contact area between the pin and the groove edge may be increased, at least by a slope which is larger than any slope within the contact area. The length of the repetitive contact area can be defined by $2*R*\sin(\pi/k)*\sin(\text{acute angle})$, wherein k equals the number of pivot axes.

The invention will hereafter be elucidated with reference to very schematic drawings showing embodiments of the invention by way of example.

FIGS. 5A-5B are an illustrative view of a path that is followed by a pin of a pin-groove coupling of FIG. 4 on a large scale.

Figure 1:
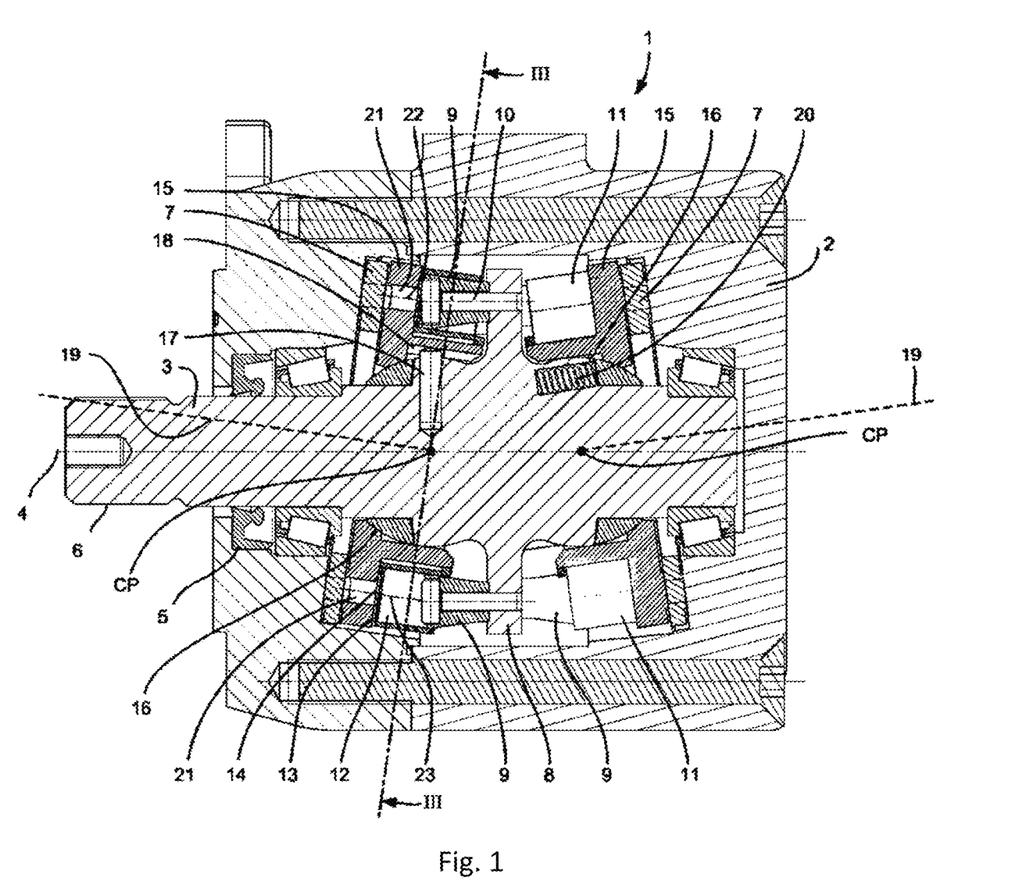
FIG. 1 is a cross-sectional view of an embodiment of a hydraulic device according to the invention.

FIG. 1 shows internal parts of a hydraulic device 1, such as a pump or hydromotor, which are fitted into a housing 2 in a known manner. The hydraulic device 1 is provided with a shaft 3 which is supported by bearings at both sides of the housing 2 and it is rotatable about a first axis of rotation 4. The housing 2 is provided on the one side with an opening with a shaft seal 5 in a known manner, as a result of which the end of the shaft 3, which is provided with a toothed shaft end 6, protrudes from the housing 2. A motor can be coupled to the toothed shaft end 6 if the hydraulic device 1 is a pump, and a driven tool can be coupled thereto if the hydraulic device 1 is a motor.

The hydraulic device 1 comprises face plates 7 which are mounted inside the housing 2 at a distance from each other. In the embodiment as shown the face plates 7 have fixed positions with respect to the housing 2. The shaft 3 extends through central through-holes in the face plates 7.

The shaft 3 is provided with a flange 8 which extends perpendicularly to the first axis of rotation 4. A plurality of pistons 9 are fixed at both sides of the flange 8 at equiangular distance about the first axis of rotation 4, in this case fourteen pistons 9 on either side. FIG. 1 shows that each piston 9 is fixed to the flange 8 by means of a piston pin 10 which is pressed into the flange 8. The pistons 9 have centrelines which extend parallel to the first axis of rotation 4. The planes of the face plates 7 are angled with respect to each other and with respect to the plane of the flange 8.

Each of the pistons 9 cooperates with a cylindrical sleeve 11 to form a compression chamber 12 of variable volume. The hydraulic device 1 as shown in FIG. 1 has 28 compression chambers 12. Each cylindrical sleeve 11 comprises a sleeve bottom 13 including a sleeve opening 14. Each piston 9 is sealed directly to the inner wall of the sleeve 11 through a ball-shaped piston head.

The sleeve bottoms 13 are supported by two barrel plates 15 which are fitted around the shaft 3 at respective partly spherical portions 16 thereof. The spherical portions 16 have respective centre points CP which are located remote from the flange 8. The barrel plates 15 are coupled to the shaft 3 by means of pin-groove couplings. Each coupling comprises a pin 17 which is fixed in the shaft 3 and a groove 18 in the barrel plates 15 in which the pin 17 is received. Each pin 17 is cylindrical and has a circular cross-section. Each of the grooves 18 has a longitudinal direction which extends perpendicular to the plane of the corresponding face plate 7. In this embodiment each of the grooves 18 has parallel groove edges. Each pin 17 and cooperating groove 18 together with the corresponding spherical portion 16 form a pivot joint. The pin-groove couplings serve to rotate the barrel plates 15 together with the shaft 2 under operating conditions.

The barrel plates 15 rotate about respective second axes of rotation 19 which are angled with respect to the first axis of rotation 4 by respective swash angles. The second axes of rotation 19 intersect the first axis of rotation 4 at the respective centre points CP. This means that the cylindrical sleeves 11 also rotate about the respective second axes of rotation 19. As a consequence, upon rotating the shaft 2 the volumes of the compression chambers 12 change. During rotation of the barrel plates 15 each cylindrical sleeve 11 makes a combined translating and swivelling motion around the cooperating piston 9. Therefore, the outer side of each piston head is ball-shaped. The ball-shape creates a sealing line between the piston 9 and the cylindrical sleeve 11 which extends perpendicularly to the centreline of the cooperating cylindrical sleeve 11. The pistons 9 are conical and their outer diameters outside the respective piston heads decrease towards the flange 8 in order to allow the relative motion of the cooperating cylindrical sleeves 11 about the pistons 9.

The sides of the respective barrel plates 15 which are directed away from the flange 8 are supported by the face plates 7. Due to the inclined orientation of the face plates 7 with respect to the flange 8 the barrel plates 15 pivot about the partly spherical portions 16 during rotation with the shaft 3.

The barrel plates 15 are pressed against the respective face plates 7 by means of springs 20 which are mounted in holes in the shaft 3. The compression chambers 12 communicate via the sleeve openings 14 in the respective sleeve bottoms 13 with cooperating barrel plate ports 21 in the barrel plates 15. Each of the barrel plate ports 21 has a centreline 22 extending parallel to the second axis of rotation 19 and running through a centre of the barrel plate port 21 which centre lies in rotational direction about the second axis of rotation 19. Each of the sleeve openings 14 has a centreline 23. It is desired to keep the centreline 22 of the barrel plate port 21 and the centreline 23 of the corresponding sleeve opening 14 as close as possible to each other under operating conditions in order to keep the pressure fields between the barrel plate 15 and the sleeves 11 aligned as much as possible.

The barrel plate ports 21 alternatingly communicate via face plate ports in the face plates 7 with a high-pressure port and a low-pressure port in the housing 2.

Figure 2:
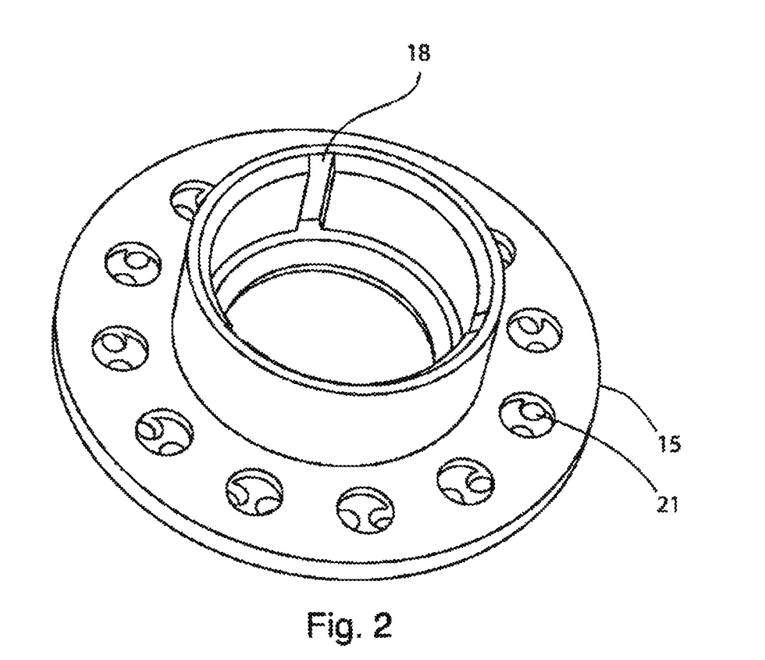
FIG. 2 is a perspective view of a barrel plate of the embodiment as shown in FIG. 1.
Figure 3:
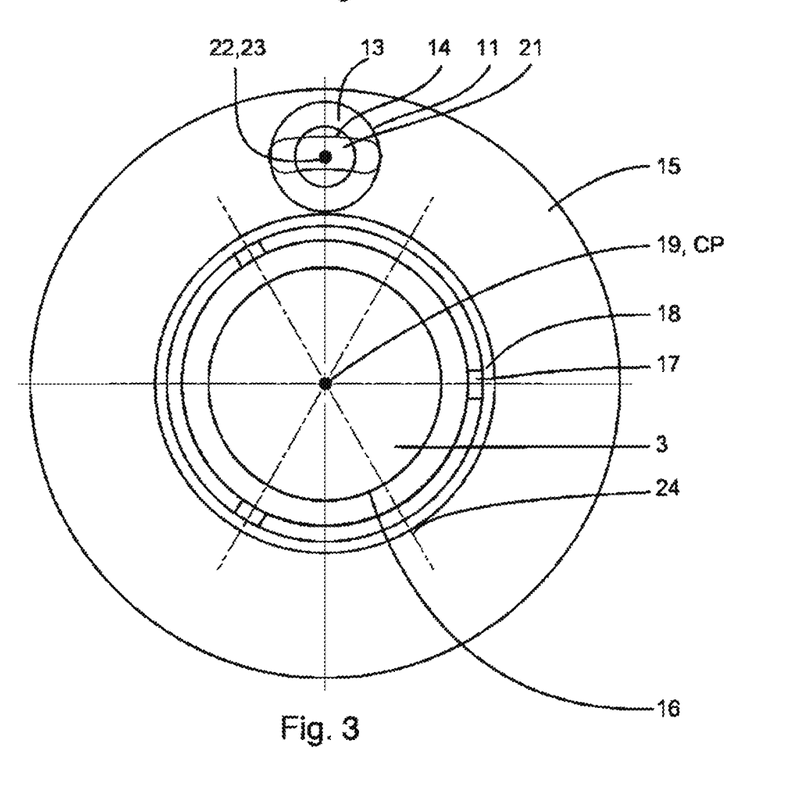
FIG. 3 is a cross-sectional view along the line III-III in FIG. 1, illustrating only one sleeve that is placed at one cooperating barrel plate port and without showing the pistons.

FIG. 2 shows the barrel plate 15 as a separate part and FIG. 3 shows a part of the barrel plate 15 on which one sleeve 11 is placed. FIG. 3 shows three pin-groove couplings. The pins 17 are located at equiangular distance about the first axis of rotation 4 and the grooves 18 are located at equiangular distance about the second axis of rotation 19. This configuration results in three pivot axes 24 which are located at an equiangular distance from each other about the second axis 19 and intersect each other at the centre point CP. It is also possible to create the three pivot axes 24 by six pin-groove couplings, wherein each coupling has a mirrored coupling located at an angular distance of 180° about the second axis of rotation 19.

FIG. 3 shows a condition in which the centrelines 22, 23 of the barrel plate port 21 and the sleeve opening 14 coincide. However, under operating conditions the rotational speed of the barrel plate 15 and the shaft 3 vary with respect to each other during each revolution of the shaft 3. The extent of variation depends on the selected swash angle. Since the pins 17 rotate about the first axis of rotation 4 and the grooves 18 rotate about the second axis of rotation 19 they have a relative motion with respect to each other during each revolution of the shaft 3. When rotating the shaft 3 at a constant speed each pin 17 moves in three directions with respect to its corresponding groove 18: in longitudinal, depth and lateral direction of the groove 18, whereas each of the three pins 17 contacts a groove edge of its corresponding groove 18 during a part of each revolution. During such a contact period the barrel plate 15 does not rotate at a constant speed when the shaft 3 rotates at a constant speed. As a consequence, the centrelines 22, 23 of each barrel plate port 21 and the corresponding sleeve opening 14 fluctuate with respect to each other in rotational direction about the second axis of rotation 19.

According to the invention the relative position of the shaft 3 and the barrel plate 15 in rotational direction about the second axis of rotation 19 is adapted such that under operating conditions the centreline 22 of each barrel plate port 21 fluctuates in rotational direction about the second axis of rotation 19 within a range in which the centreline 23 of the corresponding sleeve opening 14 lies. In order to achieve this condition the widths of the grooves must be such that they allow the respective pins 17 to move within the corresponding grooves 18 in rotational direction about the second axis of rotation 19 under operating conditions.

Figure 4:
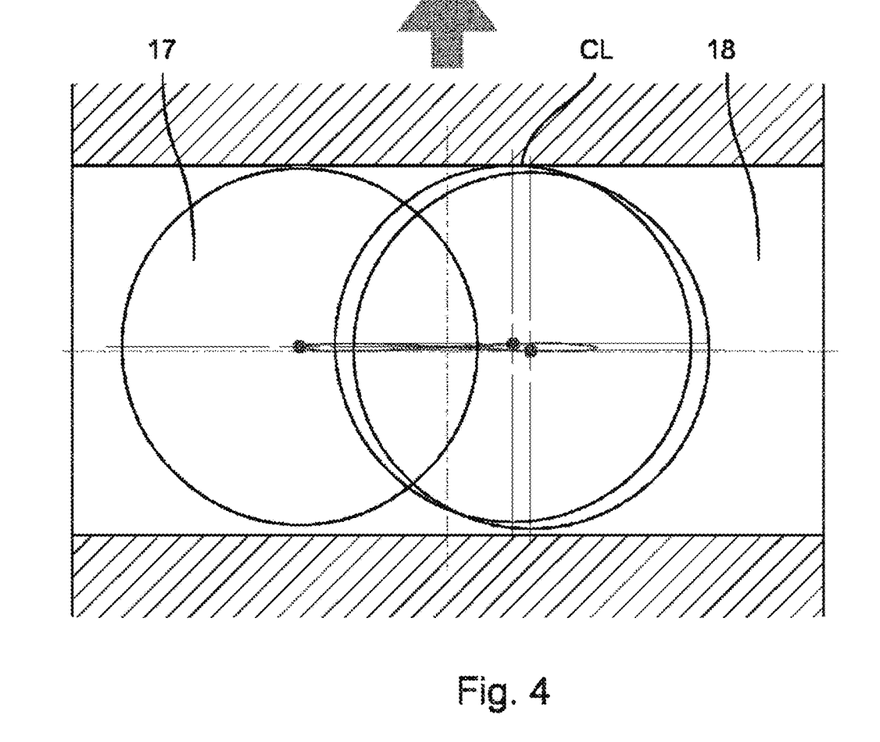
FIG. 4 is an illustrative enlarged view of a pin-groove coupling of the embodiment as shown in FIG. 1.
Figure 5A:
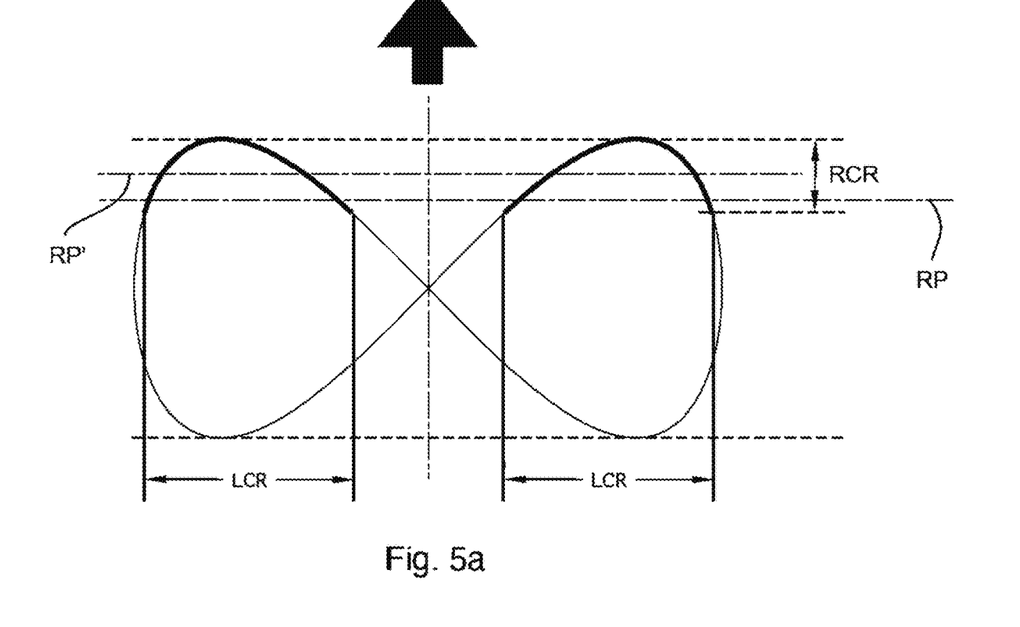
FIG. 5A is an illustrative view of the path that if followed by a pin of a pin-groove coupling such that under operating conditions each centerline of the respective barrel plate ports fluctuates in a rotational direction about the second axis of rotation with respect to the centerline of the corresponding sleeve opening within a range in which the centerline of the sleeve opening lies.
Figure 5B:
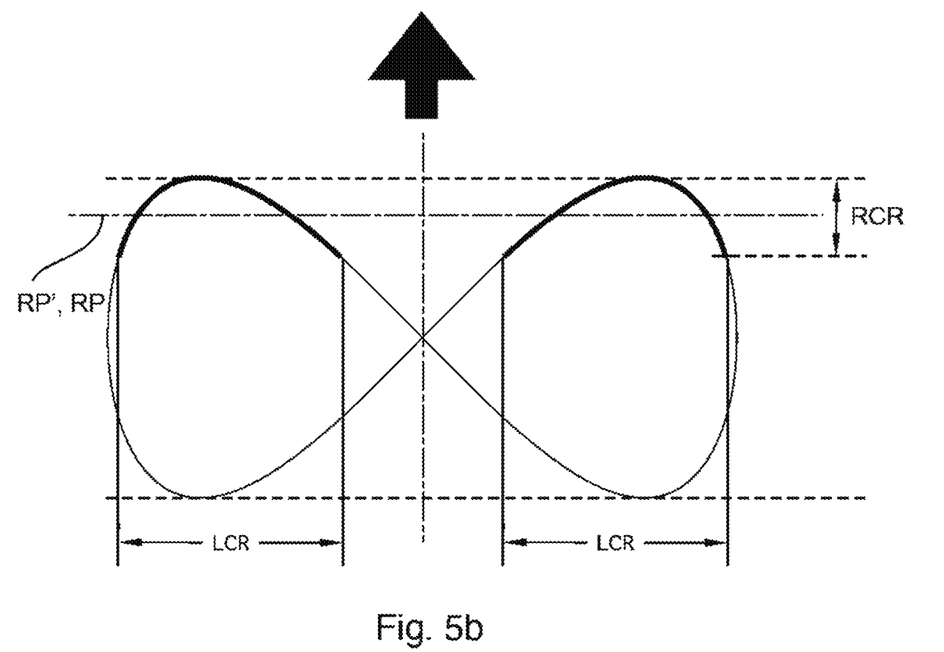
FIG. 5B is an illustrative view of the path that if followed by a pin of a pin-groove coupling such that under operating conditions the centerline of each of the barrel plate ports fluctuates symmetrically about the centerline of the corresponding sleeve opening.

The relative movements of the three pins 17 and the corresponding grooves 18 will be illustrated by means of FIGS. 4 and 5A-5B. FIG. 4 shows three pins 17 in three respective grooves 18 which have an angular distance of 120° with respect to each other, but which are superimposed in FIG. 4 for explanatory reasons. For that reason, it seems that the three pins 17 are located in a single groove 18, but it should be noted that a single pin 17 is received by a single groove 18. The width of each groove 18 is shown in vertical direction and the longitudinal direction of each groove 18 is shown in horizontal direction in FIG. 4. A lemniscate line describes a path which is followed by the centrelines of each of the pins 17 in their respective grooves 18 when the shaft 3 rotate at a constant speed. FIG. 4 shows the actual positions of the pins 17 in their respective grooves 18. The respective pins 17 follow the same lemniscate path during each revolution, but at mutual phase shifts. Because of the relative movement of the pins within the grooves 18 in lateral direction thereof, the width of each groove 18 must be larger than the diameter of the pin 17.

FIG. 4 shows that one of the pins 17 contacts a groove edge at a contact location CL when the shaft 3 including the pins 17 is driven in one direction which is indicated by the arrow in FIG. 4. During rotation of the shaft 3 the contact location CL will shift along the groove edge and at a certain moment the contact between that pin 17 and the groove edge will be lost and another pin 17 in another corresponding groove 18 will take it over and contact its corresponding groove edge. During a period of contact between one pin 17 and its corresponding groove edge the contact location CL will not only travel along the groove edge, but also rotate with respect to the shaft 3 about the second axis of rotation 19 by an angle which varies with respect to the angle about which the shaft 3 rotates about the first axis of rotation 4 within the same period. As a result the centreline 22 of each of the barrel plate ports 21 also varies with respect to the centreline 23 of each of the corresponding sleeve openings 14. Consequently, pressure fields of the sleeves 11 and the barrel ports 21 are temporarily not in line causing barrel tipping torque load.

The fluctuations can be explained further by means of FIGS. 5A-5B, which show the lemniscate path of one of the pins 17 on a larger scale. The lemniscate path is depicted with respect to an imaginary radial plane RP which extends radially from the second axis of rotation 19 and rotates about the axis of rotation 19 at a constant speed synchronously with the shaft 3. The lemniscate path has two portions which are indicated by thick lines in FIGS. 5A-5B, where the pin 17 contacts the groove edge in the contact location CL, for example when driving the barrel plate 15 by the shaft 3. In other words, each pin 17 contacts its groove edge along two longitudinal contact ranges LCR during each revolution of the shaft 3, in the present embodiment two periods of 60 degrees about the second axis of rotation 19. In the period outside these thick lines the pin 17 does not contact the groove edge in the corresponding groove 18, but one of the other pins 17 will contact its corresponding groove edge in order to drive the barrel plate 15. As a result, each of the pins 17 fluctuates about its corresponding imaginary radial plane RP, but the contact location CL varies within a rotational contact range RCR during a period in which the pin 17 contacts the groove edge. FIGS. 5A-5B show that the amplitude of the fluctuation of the contact location CL within the rotational contact range RCR is smaller than the amplitude of a pin 17 with respect to its corresponding imaginary radial plane RP.

The fluctuation of the contact location CL within the rotational contact range RCR causes a fluctuation of the relative locations of the centrelines 22, 23 of the barrel plate ports 21 and the sleeve openings 14 respectively. Due to the plurality of the pivot axes 24 the amplitude of this fluctuation is relatively small when compared with a prior art device that has a single pivot axis. However, the rotational contact range RCR fluctuates about a second imaginary radial plane RP', as indicated in FIGS. 5A-5B, which second imaginary radial plane RP' extends radially from the second axis of rotation 19 and rotates about the axis of rotation 19 at a constant speed synchronously with the shaft 3. The second imaginary radial plane RP' has an angular phase shift PS with respect to the imaginary radial plane RP about the second axis of rotation 19. In order to minimize the phase shift PS the relative position of the shaft 3 and the barrel plate 15 in rotational direction about the second axis of rotation 19 is adapted such that under operating conditions the centreline 22 of each barrel plate port 21 fluctuates in rotational direction about the second axis of rotation 19 with respect to the centreline of the corresponding sleeve opening 14 within a range in which the centreline 23 of the corresponding sleeve opening 14 lies.

The compensation of the phase shift only functions if the hydraulic device 1 is operated in one direction. If the device is operated in opposite rotational direction a phase shift would be re-introduced. For that reason it should be preferably applied in a device 1 which is used in only one rotational direction.

Figure 6:
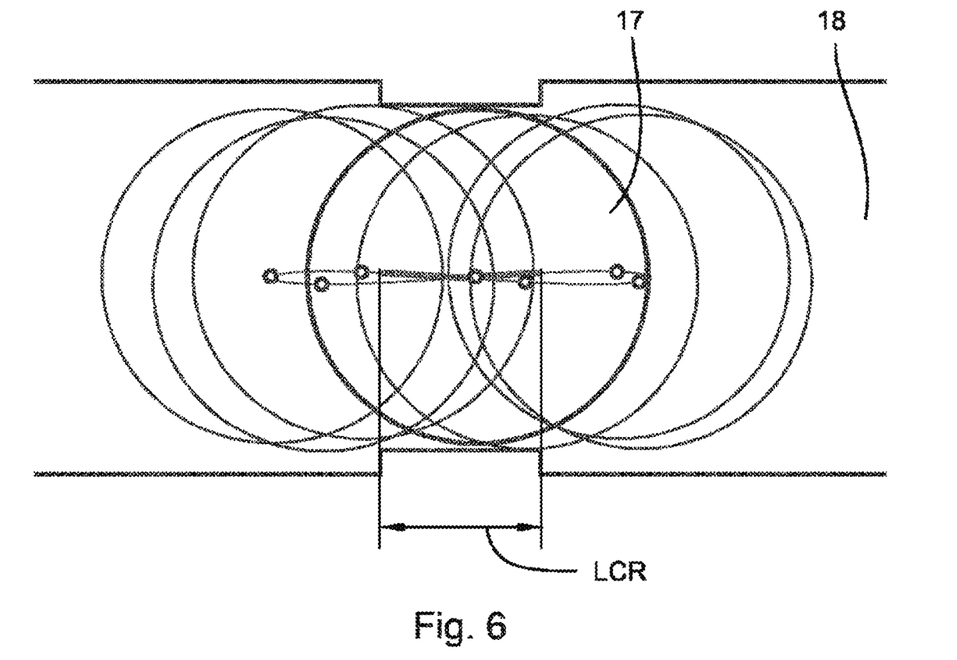
FIG. 6 is a similar view as FIG. 4 of another embodiment.

A still larger number of pivot axes leads to a narrower rotational contact range RCR. FIG. 6 shows a similar illustration as FIG. 4 of another embodiment of the hydraulic device 1, which is provided with seven pivot axes that are formed by seven pin-groove couplings located at equiangular distance about the second axes of rotation 19. In this case the groove edges of each of the grooves 18 are also parallel. FIG. 6 shows the lemniscate path which is followed by the centreline of each of the pins 17 in their respect grooves 18 and the actual positions of the pins 17 in their respective grooves 18. Because of the relative movement of the pins 17 within the grooves 18, the width of each groove 18 must be larger than the diameter of the corresponding pin 17. However, as shown in FIG. 6, the longitudinal contact range LCR is now located at a central portion of the groove 18 in longitudinal direction thereof. Theoretically the length of the groove 18 may have the same length as the longitudinal contact range LCR. This means that the width of the groove 18 outside the longitudinal contact range LCR may be increased in order to allow the pins 17 which are temporarily out of contact with the groove edge to move into the widened portions of the respective grooves 18. In other words, the width of the central portion may be relatively narrow which minimizes any phase shift as described above in relation to FIGS. 5A-5B.

Figure 7:
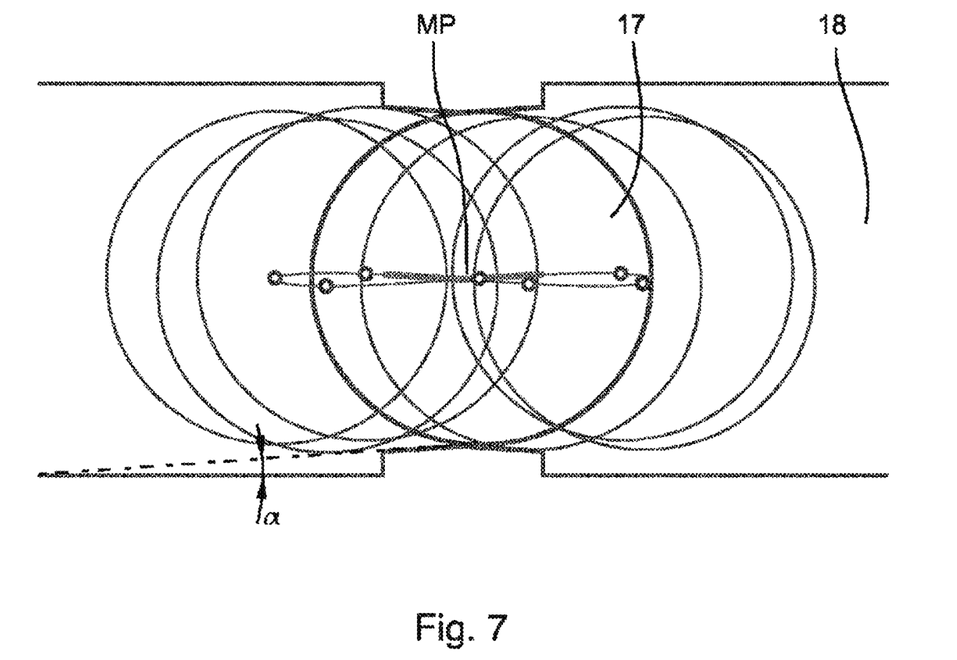
FIG. 7 is a similar view as FIG. 4 of still another embodiment.

An alternative solution to minimize any phase shift is provided by an embodiment as shown in FIG. 7. Similar to the embodiment as shown in FIG. 6 there are seven pins 17 which follow respective lemniscate paths, but in this case the opposite groove edges at the contact areas between the pins 17 and the groove edges have a different shape. Each of the grooves 18 has a midpoint MP from which the groove width increases gradually in opposite directions in longitudinal direction of the groove 18. The groove width at the midpoint MP may be such that the pins 17 exactly fit between the opposite groove edges. The shape of the groove edges are similar or approach the path of the contact locations between the pins 17 and their groove edges. For example, at least at the midpoint MP of each of the grooves 18 each of the groove edges is angled with respect to the longitudinal centreline of the groove 18 by an angle α which equals a half of the swash angle. In this case there is no phase shift upon rotating the shaft 3 in opposite directions such that no compensation is required. If the hydraulic device 1 has a variable swash angle the groove edges should be angled by a half of the maximum swash angle. Turning to a lower swash angle will lead to a phase shift, but this effect decreases with an increasing number of pivot axes 24.

Figure 8:
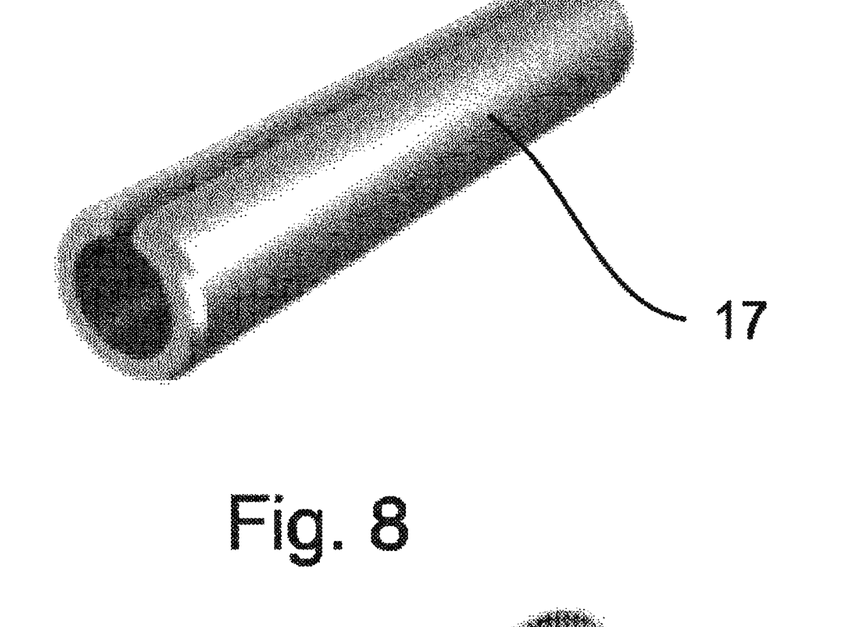
FIGS. 8 and 9 are perspective views of pins of alternative pin-groove couplings.
Figure 9:
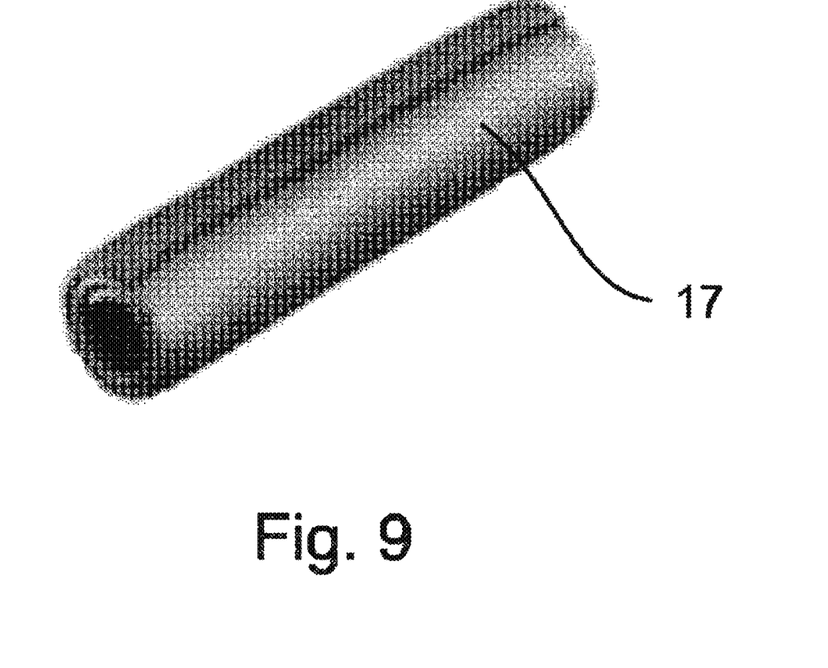

In order to create some degree of flexibility in the pin-groove couplings the pins 17 may be flexible, for example a pin which is provided with a longitudinal slot as shown in FIG. 8 or a coiled configuration as shown in FIG. 9.

Figure 10:
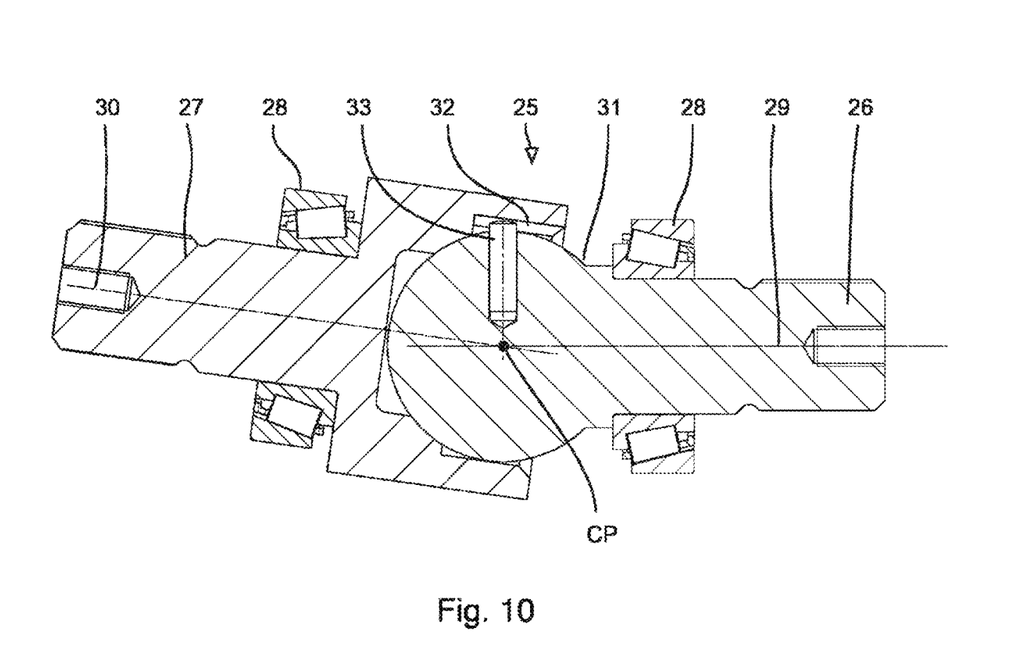
FIG. 10 is a cross-sectional view of an embodiment of a pivot joint according to the invention.

The pin-groove couplings as described hereinbefore are not limited to hydraulic devices, but are also useful in other applications where rotational speed fluctuations and phase shifts are undesired. FIG. 10 shows an embodiment of a pivot joint 25 according to the invention. The pivot joint 25 comprises a first shaft 26 and a second shaft 27. Both shafts 26, 27 are supported by bearings 28. The first shaft 26 is rotatable with respect to its bearing 28 about a first axis of rotation 29 and the second shaft 27 is rotatable with respect to its bearing 28 about a second axis of rotation 30. The first axis of rotation 29 and the second axis of rotation 30 intersect each other at a centre point CP by an acute angle. The centre point CP is the centre of a partly spherical portion 31 of the first shaft 26. The second shaft 27 is mounted to the partly spherical portion 31 and coupled to the first shaft 26 in rotational direction thereof by means of a plurality of pin-groove couplings.

In the embodiment as shown in FIG. 10 each pin-groove coupling comprises a groove 32 which is located in an interior portion of the second shaft 27 and a pin 33 which is fixed in the partly spherical portion 31. The pin 33 is cylindrical and has a circular cross-section. The groove 32 has a longitudinal direction which extends in the same direction as the second axis of rotation 30. Each of the pins 33 is received by its corresponding groove 32. Each pin-groove coupling forms a pivot axis about which the second shaft 27 rotates with respect to the first axis 26 upon rotation of the shafts 26, 27 about their axes of rotation 29, 30. Each pivot axis extends perpendicular to the second axis of rotation 30 and runs through the centre point CP. The pin-groove couplings are arranged such that a plurality of pivot axes are created at equiangular distance about the second axis of rotation 30.

Figure 11:
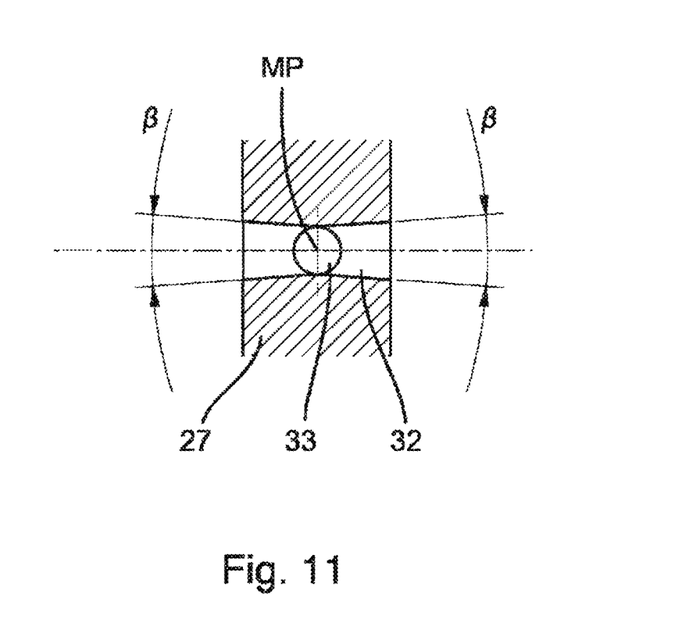
FIG. 11 is an enlarged sectional view of a part of the second shaft of the embodiment of FIG. 10, showing one of the grooves.

FIG. 11 shows one of the grooves 32 in more detail. It can be seen that the groove 32 has a midpoint MP from which the groove width increases in opposite directions in longitudinal direction of the groove 32. The width of the groove 32 at the midpoint MP may be such that the cooperating pin 33 accurately fits in the groove 32. The opposite groove edges are angled with respect to each other by an angle β which depends on the acute angle between the first and second axes of rotation 29, 30. Preferably the angle β equals the acute angle. If the acute angle is variable the angle β is preferably a predefined maximum acute angle. An advantage of the pivot joint 25 is that the pin groove couplings are relatively simple and low-cost, whereas the shapes of the groove edges minimize a phase shift between the first and second shaft 26, 27 under operating conditions.

The invention is not limited to the embodiments as shown in the drawings and described hereinbefore, which may be varied in different manners within the scope of the claims and their technical equivalents. For example, it is also conceivable to provide the grooves in the partly spherical portion of the shaft and the pins in the barrel plate. Furthermore, the hydraulic device according to the invention may also be a hydraulic transformer.

The invention claimed is:

1. A hydraulic device comprising
a housing,
a shaft which is mounted in the housing and rotatable with respect to the housing about a first axis of rotation, wherein the shaft has a flange extending transversely to the first axis of rotation, and a partly spherical portion including a center point remote from the flange,
a plurality of pistons including respective piston centerlines which have components extending parallel to the first axis of rotation, which pistons are fixed to the flange at equiangular distance about the first axis of rotation, a plurality of cylindrical sleeves,
wherein each sleeve has a sleeve bottom comprising a sleeve opening including a centerline, which sleeves cooperate with the pistons to form respective compression chambers of variable volume,
a barrel plate which is mounted on the partly spherical portion of the shaft and which has barrel plate ports including respective centerlines,
wherein the barrel plate has a first side which supports the sleeve bottoms and an opposite second side which is supported by a face plate that is mounted in the housing and angled with respect to the first axis such that the sleeves are rotatable about a second axis of rotation which intersects the first axis of rotation at said center point by an acute swash angle such that during rotating the shaft the volumes of the compression chambers change,
wherein the barrel plate is coupled to the shaft in a rotational direction thereof by means of a pin-groove coupling where a groove is located in one of said partly spherical portion and the barrel plate and a pin is located in another one of said partly spherical portion and the barrel plate,
wherein the groove has a longitudinal direction extending in the same direction as one of the first and second axis of rotation and the pin is received by said groove, hence creating a pivot axis of the barrel plate which extends perpendicular to the second axis of rotation and runs through the center point,
wherein under operating conditions each compression chamber alternatingly communicates via the corresponding sleeve opening and barrel plate port with ports in the face plate, the hydraulic device comprises a plurality of said pin-groove couplings creating a plurality of pivot axes at equiangular distance about the second axis of rotation,
and wherein widths of the grooves allow the pins to move within the respective corresponding grooves in rotational direction about the second axis of rotation under operating conditions, and the relative position of the shaft and the barrel plate in rotational direction about the second axis of rotation is adapted such that under operating conditions each centerline of the respective barrel plate ports fluctuates in a rotational direction about the second axis of rotation with respect to the centerline of the corresponding sleeve opening within a range in which the centerline of the sleeve opening lies.

2. The hydraulic device according to claim 1, wherein each of the grooves has parallel groove edges.

3. The hydraulic device according to claim 1, wherein each of the grooves has a midpoint from which the groove width increases in opposite directions in longitudinal directions of the groove.

4. The hydraulic device according to claim 3, wherein each of the grooves has groove edges and at least at the midpoint of each of the groove edges is angled with respect to a longitudinal centerline of the groove by a half of the swash angle.

5. The hydraulic device according to claim 4, wherein the swash angle is variable and has a maximum and each of the groove edges is angled by a half of the maximum swash angle.

6. The hydraulic device according to claim 3, wherein the pins accurately fit in the respective grooves at their midpoints.

7. The hydraulic device according to claim 4, wherein groove edges of each groove are substantially straight from the midpoint to at least a location where the pins and the groove edges loose contact under operating conditions.

8. The hydraulic device according to claim 2, wherein the width of the groove outside a repetitive contact area between the pin and one said groove edge is increased, at least by a slope which is larger than any slope within the contact area.

9. The hydraulic device according to claim 1, wherein the pins of the respective pin-groove couplings are fixed in the shaft and the grooves are located in the barrel plate.

10. The hydraulic device according to claim 1, wherein the pins are cylindrical and have a circular cross-section.

11. The hydraulic device according to claim 1, wherein the centerline of each of the barrel plate ports fluctuates symmetrically about the centerline of the corresponding sleeve opening.

* * * * *

UNITED STATES PATENT AND TRADEMARK OFFICE
CERTIFICATE OF CORRECTION

| | | |
|---|---|---|
| PATENT NO. | : 11,802,539 B2 | Page 1 of 1 |
| APPLICATION NO. | : 16/646058 | |
| DATED | : October 31, 2023 | |
| INVENTOR(S) | : Achten | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this
Eighth Day of July, 2025

Coke Morgan Stewart
*Acting Director of the United States Patent and Trademark Office*